UNITED STATES PATENT OFFICE.

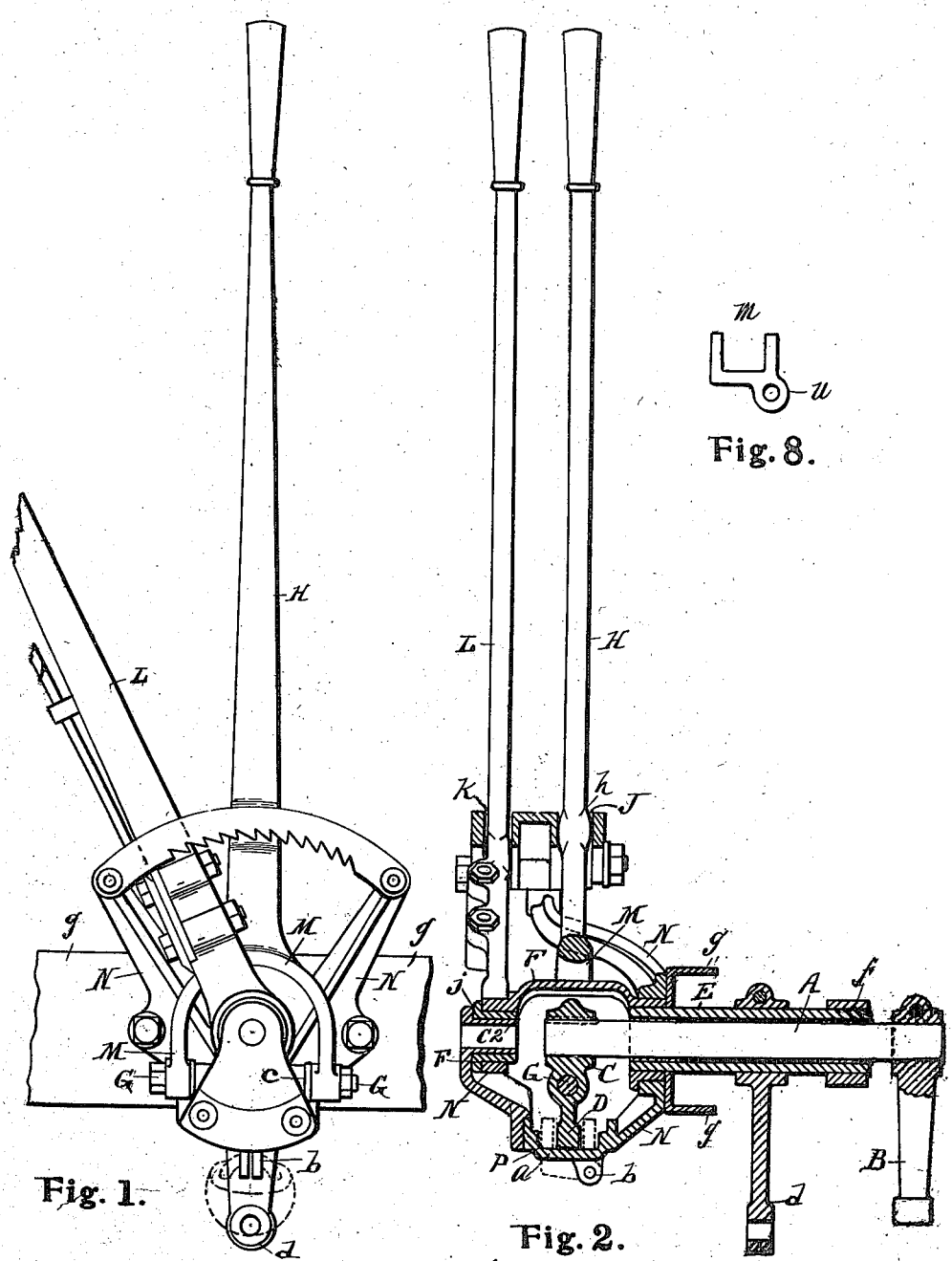

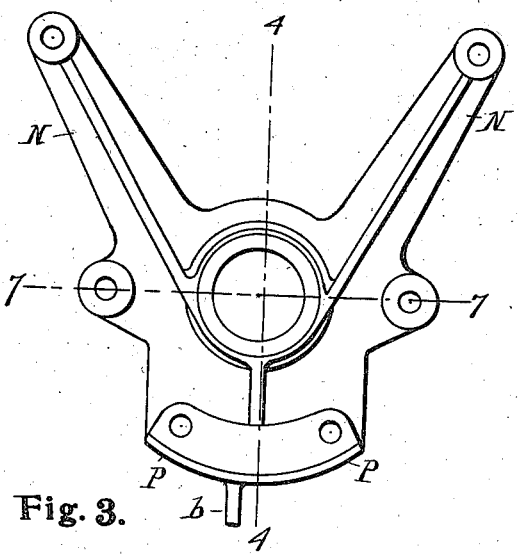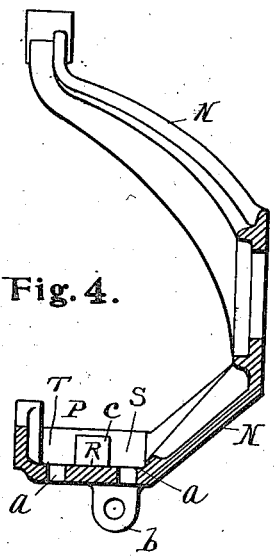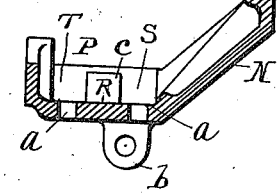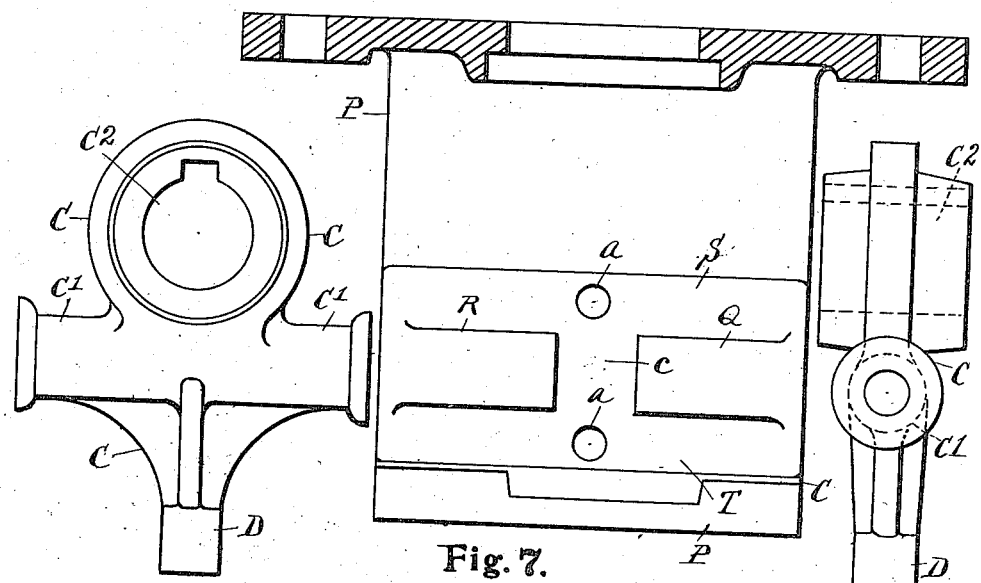

HORACE T. THOMAS, OF LANSING, MICHIGAN, ASSIGNOR TO REO MOTOR CAR COMPANY, OF LANSING, MICHIGAN, A CORPORATION OF MICHIGAN.

CONTROL MECHANISM FOR CHANGE-SPEED GEARING.

1,002,188. Specification of Letters Patent. Patented Aug. 29, 1911.

Application filed November 8, 1909. Serial No. 526,698.

*To all whom it may concern:*

Be it known that I, HORACE T. THOMAS, a citizen of the United States, residing at Lansing, county of Ingham, State of Michigan, have invented a certain new and useful Improvement in Control Mechanism for Change-Speed Gearing, and declare the following to be a full, clear, and exact description of the same, such as will enable others skilled in the art to which it pertains to make and use the same, reference being had to the accompanying drawings, which form a part of this specification.

My invention relates to an operating device for a change speed gear of the selective type, and the object of my invention is to provide an improved operating device for this type of gear as used on automobiles. I accomplish this object in the device shown in the accompanying drawings in which—

Figure 1, is a side elevation of a portion of the side piece of an automobile chassis, with the controlling lever or device embodying my invention attached thereto, showing the same locked by a padlock which is represented by dotted lines. Fig. 2, is a sectional elevation of same. Fig. 3, is a detail elevation of the supporting bracket and guide plate. Fig. 4, is a section on the line 4—4, Fig. 3, looking from the right of the latter figure. Fig. 5, is a face view of the forging by which the controlling lever is united to the shaft carrying the shifting arm. Fig. 6, is an end view of the parts shown in Fig. 5. Fig. 7, is a section on the line 7—7, Fig. 3 looking downward so as to show the construction of the surface of the guide plate in which the end D of the forging shown in Figs. 5 and 6 works. Fig. 8, is a detail of the locking plate.

A is a shaft supported horizontally so that it may turn and slide in the direction of its length.

B is an arm on the inner end of the shaft A, adapted to engage with different parts of the gear when the shaft A is moved in the direction of its length, and adapted to actuate said parts when said shaft is turned. This operation of the arm B is that ordinarily seen in the "selective" type of change speed gears and is therefore not fully illustrated and described inasmuch as it is well understood by those conversant with the art.

C is a forging adapted to be keyed on the outer end of the shaft A.

C' is a cylindrical cross piece on the forging C, extending horizontally across the same and adapted to support a pin G which passes through C' C' protruding from each end thereof.

D is a hardened guide-point upon the lower end of a projection or finger from the forging C.

E is a sleeve surrounding the shaft A and bearing in the side piece $g$ of the chassis and a stationary bearing $f$. The sleeve E carries an arm $d$ by which the brake is manipulated. From the outer end of the sleeve E extends a semi-tubular portion F which reaches over the forging C and is pivoted at its outer end upon a trunnion or fixed pivot $C^2$ in line with the shaft A.

N is a bracket having two upwardly extending branches, as indicated most distinctly in Fig. 3, which bracket is secured to the side piece $g$ of the chassis and surrounds the shaft A and serves as a bearing for the extension F from the sleeve E. The bracket N supports the fixed pivot $C^2$ upon which the outer end of the extension F is pivoted. A quadrant extends between the upper end of the branches of the bracket N, as indicated in Fig. 1. This quadrant has two grooves J and K, in the latter of which works the brake lever L which is secured at its lower end to the extension F from the sleeve E.

H is the controlling lever of the change speed gear. Said lever is provided with a yoke N at its lower end (Fig. 1), the branches of which are secured upon the protruding ends of the bolt, or shaft G, to pivotally secure said lever. The lever H is formed at $h$ into curved surfaces or bulge portions which contact the sides of the groove J (Fig. 2) to facilitate the turning of the shaft about a point in this groove when it is moved in a plane passing through the axis of the shaft A. Thus it will be seen that the lever H is adapted to move in two directions, one parallel to the motion of the lever L by which the shaft A is turned about its axis and the arm B caused to move one of the other parts of the change speed gear. The other motion of the lever H moves the shaft A longitudinally of said shaft and causes the arm B to engage one or the other of the actuating parts of the change speed gear.

R and Q (Fig. 7) are lugs upon the upper surface of the guide plate P which is supported by the bracket N. These lugs in conjunction with the other indicated formations of the surface of said guide plate form the two grooves S and T and the gate c or gate which joins the middle portions of the grooves S and T. The hardened pointer D moves in the grooves S, T and gate c according to the position and movement of the lever H. For instance if the handle of the lever H is drawn toward the chassis, the shaft A is moved outward and the pointer D moves into the groove T, at which position the handle of the lever H may be moved parallel to the side piece g of the chassis, the pointer D moving from end to end of the groove T to rock the shaft A and actuate the selected part of the change speed gear by the lever arm B. Now if the lever H is returned to its central position and the handle pressed away from the chassis, the lever A will be moved inward, the pointer D passing through the gate c into the groove S at which position the lever arm H may be moved back and forward in the groove J carrying the pointer D from end to end in the groove S to actuate the arm B through rocking the shaft A. When the lever arm H is returned to its central position and again moved to the position shown in Fig. 2, the pointer D will come between the lugs Q and R and such lugs will prevent the rotation of the shaft A and hold the actuating mechanism in its neutral position.

a, a are apertures formed through the guide plate P adjacent to the ends of the gate c.

b is a lug extending downward from the guide plate P and provided with an aperture which extends through said lug. A forked locking plate m (Fig. 8) may be inserted in position when the pointer D is in its last described position, the spindles of said locking plate extending through the apertures a, a and preventing the pointer D from moving out of the groove c.

n is a perforated lug formed in the locking plate m and adapted to come adjacent to and register with the lug b. The hasp of a padlock as shown by the dotted lines in Fig. 1 may be passed through the apertures of the lugs b and n when the locking plate is in position as indicated in Fig. 1, to hold said plate in its adjusted position and securely locking the controlling lever in its neutral position.

Claims:—

1. A gear control device, having in combination a shaft adapted to turn and reciprocate in the direction of its length, a control lever pivoted to said shaft so as to be capable of turning in a plane parallel to the axis of said shaft, said lever being adapted to turn at a point midway its length in said guide in a plane at right angles to said guide, a guide plate provided with grooves supported opposite said guide, said lever being provided with a finger extending into said grooves, a sleeve surrounding said shaft provided with an actuating arm and extending beyond said lever, a fixed pivot supported by said guide plate in line with said first-mentioned shaft and fixed pivot, said sleeve bearing on said shaft, and a brake lever on said sleeve outside of the control lever, substantially as described.

2. In a device for the purpose described, the combination of a shaft adapted to turn and reciprocate, a control lever adapted to reciprocate and turn said shaft, a brake lever on the outside of said control lever having a sleeve oscillating on said shaft adapted to operate the brake mechanism, a guide for said levers adapted to fulcrum the control lever in reciprocating the shaft and a guide adapted to confine the control lever to any one of several paths of movement in turning said shaft and to allow it to oscillate in reciprocating said shaft, substantially as described.

3. In a device for the purpose described, the combination of a shaft adapted to turn and reciprocate, a control lever adapted to reciprocate and turn said shaft, a brake lever having a sleeve oscillating on said shaft adapted to operate the brake mechanism, a guide above said shaft adapted to constrain the levers in turning movement and to fulcrum the control lever in movement adapted to reciprocate the shaft, a finger depending from said shaft and a guide engaging said finger and adapted thereby to confine the shaft to any one of several planes of motion, substantially as described.

4. In a gear control device, the combination of a shaft reciprocable lengthwise and rotatable, a control lever connected therewith, a sleeve mounted on said shaft, a bracket having a guide plate portion and a branch supporting a fixed pivot in line with said shaft, the said sleeve having a portion over-reaching the attachment of said control lever to its shaft, and a sleeve portion supported by said over-reaching part on said fixed pivot, a brake lever attached to the sleeve portion rotatable on said fixed pivot and a finger attached to said shaft and engaging in said guide plate, substantially as described.

5. In a device for the purpose described, the combination of a shaft adapted to reciprocate lengthwise and to turn, a finger rigidly attached thereto, a control lever terminating in a yoke and having a rotatable pin passing through said finger, a guide adapted to confine said lever and act as a fulcrum therefor, a guide plate below said shaft in which said finger is adapted to travel, a sleeve rotatable on said shaft and passing through said lever yoke terminal and a brake lever attached to the terminal of said sleeve, substantially as described.

6. In a device for the purpose described, the combination of a shaft adapted to turn and reciprocate, a control lever adapted to turn and reciprocate said shaft, a sleeve adapted to control the brake mechanism, said sleeve rotatable on said shaft and reaching beyond to the outside of said control lever, and a brake lever attached to said sleeve and located on the outside of said control lever, substantially as described.

7. In a device for the purpose described, the combination of a shaft adapted to turn and reciprocate, a control lever, adapted to turn and reciprocate said shaft, a sleeve adapted to control the brake mechanism, the said sleeve being rotatable on said shaft and reaching beyond to the outside of the control lever, a brake lever attached to said sleeve and located on the outside of said control lever, a finger fixed to said shaft and depending therefrom, and a guide plate for said finger, substantially as described.

8. The combination of a reciprocatory and rotatable shaft having a finger fixedly attached thereto and depending therefrom, a guide plate having a plurality of grooves, and a gate connecting said grooves, the said guide plate being thereby adapted to direct the reciprocation and rotation of the shaft by engagement with said finger, the said guide plate being also provided with a pair of apertures, one on either side of said gate, a locking device comprising a pair of spindles adapted to be passed through said apertures, an apertured lug connected thereto, an apertured lug on said guide plate with which the apertured lug of the locking device is adapted to register, and a padlock having a hasp adapted to pass through said registered apertures, substantially as described.

In testimony whereof, I sign this specification in the presence of two witnesses.

HORACE T. THOMAS.

Witnesses:
GEORGE W. HEWITT,
DEAN M. PARSONS.